March 19, 1963 G. B. SHEW 3,081,965
CHANNEL WINGED AIRCRAFT
Filed Feb. 13, 1961 2 Sheets-Sheet 1
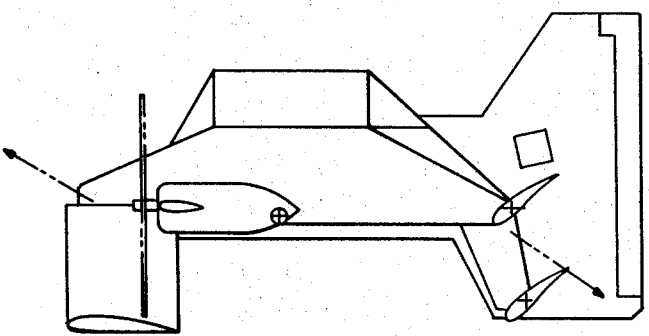
FIG 6
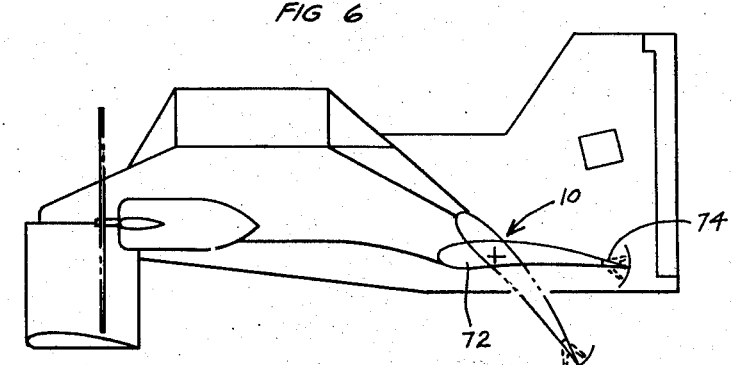
FIG 7
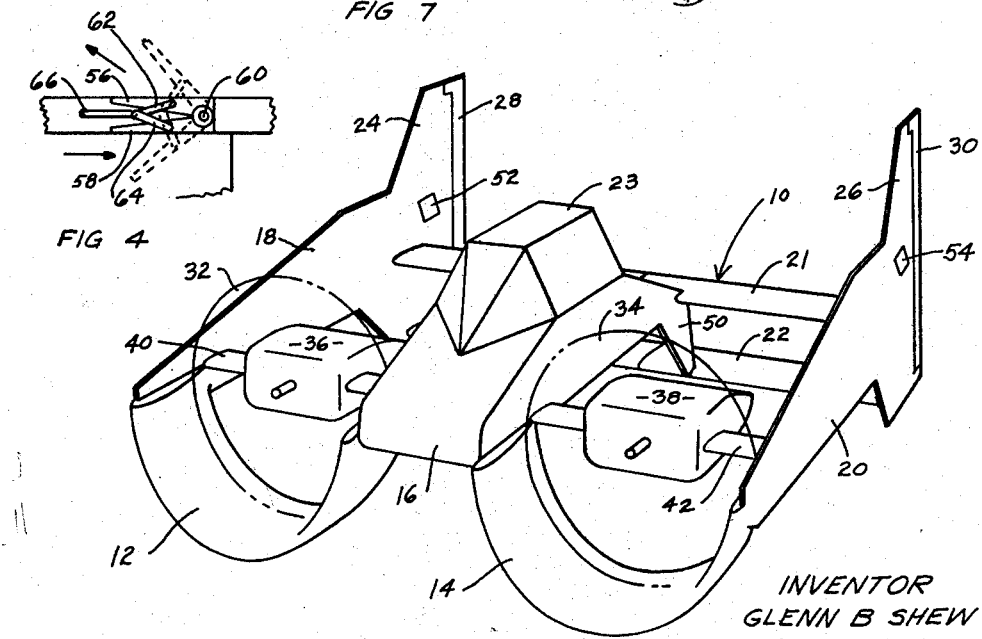
FIG 4
FIG 1
INVENTOR
GLENN B SHEW
ATTORNEYS
FULWIDER, MATTINGLY & HUNTLEY March 19, 1963     G. B. SHEW     3,081,965
CHANNEL WINGED AIRCRAFT Filed Feb. 13, 1961                             2 Sheets-Sheet 2

INVENTOR
GLENN B SHEW
ATTORNEYS
FULWIDER, MATTINGLY & HUNTLEY

United States Patent Office 3,081,965
Patented Mar. 19, 1963

---

3,081,965
CHANNEL WINGED AIRCRAFT
Glenn B. Shew, 3558 Lewis, Long Beach 7, Calif.
Filed Feb. 13, 1961, Ser. No. 88,864
15 Claims. (Cl. 244—12)

The present invention relates generally to the field of aircraft and more particularly to a high-lift aircraft of unique design.

The aircraft embodying the present invention utilizes an aft-located wing structure in conjunction with a channel-type wing structure disposed forwardly thereof. This arrangement makes possible a rugged yet light-weight construction whereby the aircraft is usable on small and unprepared fields. All of the lifting and control surfaces of this aircraft may be swept by the flow of air passing through the propeller means. Thus, good handling characteristics at low speeds may be obtained. This construction also permits a low wing loading whereby landing and take-off speeds may be extremely low actually ranging down to zero depending on the prevailing conditions. The aircraft is so designed, however, as to be capable of conventional long roll take-off and landings for heavy loads.

It is a major object of the present invention to provide a novel aircraft utilizing an aft-located wing structure in conjunction with a channel-type wing structure disposed forwardly thereof. The aft-located wing structure is preferably of the biplane type although more or less wings may be employed.

Another object of the invention is to provide an aircraft having considerable control response at low speeds.

Yet a further object of the invention is to provide an aircraft having a maximum lifting ability for a given amount of power.

A further object is to provide an aircraft which will be extremely rugged and is capable of operation from small and unprepared fields whereby it will prove especially valuable for military, agricultural, and firefighting uses.

An important object of the invention is to provide an aircraft having an aft-located wing structure, a channel-type wing structure disposed forwardly thereof, propeller means arranged within the channel-wing structure and means selectively usable to vary the angle of incidence of the aft-located wing structure so as to provide particularly short take-off and landing characteristics.

These and other objects and advantages of the present invention will become more apparent from the following detailed description when taken in conjunction with the appended drawings wherein:

FIGURE 1 is a perspective view of a preferred form of aircraft constructed in accordance with the present invention;

FIGURE 4 is an enlarged horizontal sectional view taken on line 4—4 of FIGURE 3;

FIGURE 6 is a view similar to FIGURE 5 showing the aft-located wing structure in a different position; and FIGURE 7 is a view similar to FIGURE 3 showing a second form of aircraft embodying the present invention.

Figure 2:
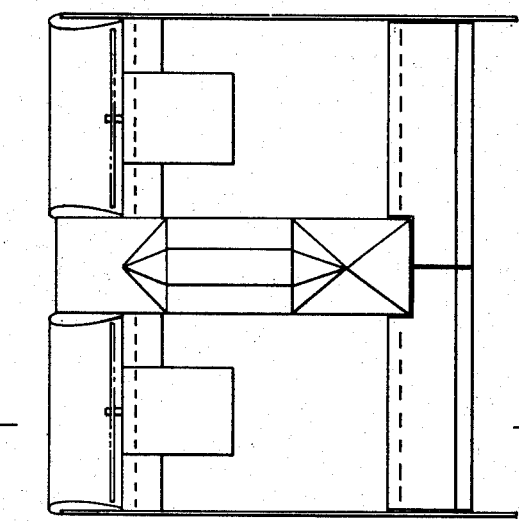
FIGURE 2 is a top plan view of said aircraft.

Referring to the first six figures of the drawings, a preferred form of aircraft embodying the present invention broadly comprises an aft-located wing structure 10, a pair of channel wing members 12 and 14, with each of these members forming a forwardly, upwardly and rearwardly opening channel, and structural means supporting the channel members 12 and 14 in side-by-side relationship. The structural means includes a fuselage 16 and a pair of boom members 18 and 20 which are secured at their front portion to the channel wing members 12 and 14, and at their rear ends to the tips of the wing structure 10. These booms 18 and 20 extend parallel with the fuselage 16.

More particularly, the aft-located wing structure 10 will preferably be of the biplane type having an upper wing 21 and a lower wing 22. The fuselage 16 includes a pilot's compartment 23 housing the conventional aircraft controls and the like. The channel wing members 12 and 14 are substantially identical and are provided with a conventional air-foil cross-section, as will be clear from FIGURE 3. The booms 18 and 20 are of upstanding plate-like configuration and are rigidly connected at their forward ends to the upper outer tips of the channel wing members 12 and 14. The rear portion of these booms are contiguous with a pair of vertical stabilizers 24 and 26, respectively. Conventional rudders 28 and 30 are provided for the vertical stabilizers.

A pair of propellers 32 and 34 are provided for the channel members 12 and 14, respectively. These propellers 32 and 34 are rotated by suitable power plants disposed within nacelles 36 and 38. The nacelles 36 and 38 are supported by a pair of horizontal struts 40 and 42, respectively, that extend between the front portion of the fuselage 16 and the booms 18 and 20, in generally vertical alignment with the rear portion of the channel members 12 and 14. Preferably, the struts 40 and 42 will have an airfoil shape. It is also possible to dispose suitable power plant means within the fuselage 16 with power transfer mechanisms extending through the struts 40 and 42 to drive the propellers 32 and 34. The nacelles 36 and 38 could be in this manner reduced in size or even eliminated.

Figure 3:
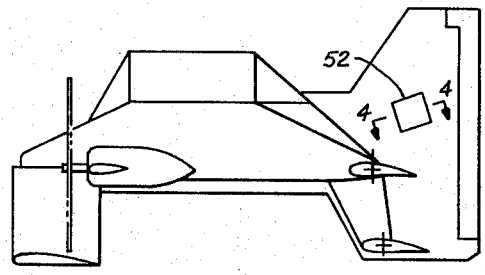
FIGURE 3 is a vertical sectional view taken on line 3—3 of FIGURE 2.

The upper and lower wings 21 and 22 of the aft-located wing structure 10 are pivotally mounted near their respective centers of pressure for pivotal movement about a horizontal axis normal to the direction of flight of the aircraft. Preferably, midportions of the upper and lower wings 21 and 22 will be supported by a pair of vertically extending struts 50 that depend from the rear portion of the fuselage 10. In this manner, a rigid construction is afforded. During normal flight, as indicated in FIGURE 3, the upper and lower wings 21 and 22 will in addition to providing lift, function as elevators. Also the right and left halves of these upper and lower wings may be operated differentially so as to serve as ailerons to thereby provide a rolling moment to the aircraft similar to that provided by the ailerons of a conventional fixed wing aircraft.

Referring now particularly to FIGURES 4 and 6, the front portion of each vertical stabilizer 24 and 26 may be provided with air brakes 52 and 54, respectively. These air brakes 52 and 54 are substantially identical in construction and each include a pair of plate elements 56 and 58 which as indicated in FIGURE 4 are pivoted at their rear portions to a vertical hinge element 60. Forwardly of the hinge 60 the intermediate portions of the plates are pivotally affixed to the rear end of one of a pair of links 62 and 64, with the front ends of such links being pivotally interconnected. A suitably actuated push rod 66 exerts longitudinal force upon the links 62 and 64 so as to move the plates 62 and 64 between their normal solid outline position of FIGURE 4 to their dotted outline open position of this figure. When arranged in such open position, rearwardly directed air will flow through the openings formed in the vertical stabilizer when the plates 62 and 64 are opened in the path indicated by the directional arrows in FIGURE 4, i.e. the direction of flow of such air is directed outwardly of the vertical stabilizers and reversed in direction so as to produce a rearwardly acting force on the aircraft. It is also possible to arrange for the rudders 28 and 30 to be concurrently turned inwardly so as to provide an air brake effect.

Figure 5:
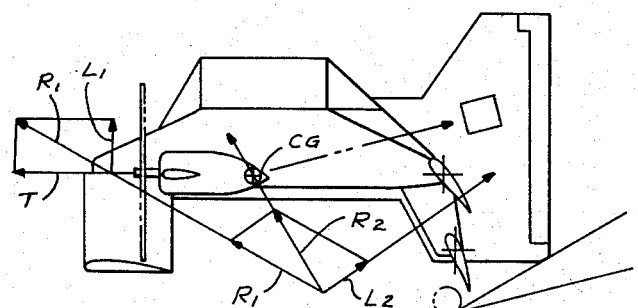
FIGURE 5 is a diagrammatic view showing the forces acting upon said aircraft during flight.

In the operation of the aforedescribed aircraft, when taking off the upper and lower wings 21 and 22 of the aft-located wing structure will be pivoted so as to increase their angle of incidence as indicated in FIGURE 5. Preferably, as indicated in this figure, the lower wing 22 is arranged at a greater angle of incidence than the upper wing 21 in negative decalage. With the upper and lower wings 21 and 22 arranged as shown in FIGURE 5, the propeller blast will be deflected downwardly and will provide maximum lift for taking off.

As a result of the aforedescribed force arrangements, it will be possible for the aircraft to remain in flight at very low ground speeds and under certain conditions it may actually hover. At this time, the booms 18 and 20 and the fins 24 and 26 will serve as end plates so as to restrain circulation of air from the propellers around the tips of the channel members and the wing 10. These booms 18 and 20 will likewise direct the air flow from the propellers 32 and 34 over the aft-located wing structure 10 so as to prevent such air flow from being dissipated into the slower moving air exteriorly of these booms. The air brakes 52 and 54 may be opened when the aircraft must take-off or land in a confined space where it is necessary to maintain the aircraft in an approximate ground level landing position without appreciable forward movement. These brakes when opened also make the aircraft less vulnerable to gusts while maneuvering close to the ground since they permit it to hover in a more nearly horizontal position.

With further reference to FIGURE 5, front and rear vector diagrams of the forces acting upon the aforedescribed aircraft during takeoff are superimposed over the side elevation of the aircraft. In the forward diagram the vector T represents the forward thrust produced by the propellers 32 and 34. The vector L1 represents the sum of the lift provided by the channel wing members 12 and 14 and the struts 40 and 42. The result of these two forces is the forwardly and upwardly extending vector R1. This vector R1 is shown transposed downwardly and rearwardly to the rear vector diagram where it intersects the lower end of the vector L2. L2 represents the sum of the lift provided by the aft-located wing structure 10 when arranged in its negative decalage position of FIGURE 5.

The sum of the vectors R1 and L2 is the vector R2. As will be apparent, the vector R2 extends forwardly and upwardly through the center of gravity C.G. of the aircraft. Accordingly, where this vector R2 has a magnitude greater than the weight of the aircraft the latter will take-off. The take-off run of the aircraft may be kept to a minimum with this aforedescribed arrangement. When the aircraft is landed, the rear wings 21 and 22 may be again pivoted to their negative decalage position of FIGURE 5 and as a result, the landing run will also be very short.

Referring now to FIGURE 6, under certain conditions it may be desirable to position the aircraft at a high angle of attack before take-off and thereby shorten the take-off run. As indicated in this figure, the upper and lower wings 21 and 22 are pivoted to a negative angle of attack. This generates a force tending to hold the aft section of the aircraft on the ground while the nose portion thereof is raised relative to the rear landing gear 70. The lift provided by the channel members 12 and 14 assist in raising the nose of the aircraft. In this manner the resultant lift vector R2 is brought towards a vertically extending position. The brakes of the rear landing gear 70 could at this time be engaged. Additionally, the air brakes 52 and 54 would be opened and the rudders 28 and 30 would preferably both be turned inwardly. With this arrangement the aircraft could take-off with a minimum forward run and in some instances such run would approximate zero. It is contemplated, however, that with heavier loads some take-off run would be required.

Referring now to FIG. 7, there is shown a second form of aircraft embodying the present invention. In this form of aircraft like parts bear primed reference numerals with respect to the first form of aircraft shown in FIGS. 1 through 6. As indicated in FIG. 7, the aft-located wing structure 10 takes the form of a single wing 72 rather than the upper and lower wings of FIGS. 1 through 6. Additionally, the rear portion of the single wing 72 will be provided with elevators 74. These elevators could also be actuated so as to serve as ailerons to thereby provide a rolling movement to the aircraft of FIGURE 7 similar to that provided by the ailerons of a conventional fixed wing aircraft. The single wing may also be split in the middle as in the biplane with each section free to act in unison or differentially to accomplish elevator or aileron action. In this form elevator-ailerons are not required at the rear. It is also possible to provide the wing 72 with spoilers (not shown).

It is possible to replace the nacelles 36 and 38 with jet engine pods. (A turbo fan-ducted fan jet engine having cold air mixed into the exhaust to thereby lower the temperature would be preferable.) The air taken in at the front of the jet engines would then flow through the channels 12 and 14 and be exhausted rearwardly over the aft-located wing structure 10. With this arrangement it would be desirable to expand or diffuse the jet engine's exhaust to thereby lower its temperature and distribute the force over a greater area. It should be also observed that the struts 40 and 42 could be raised to the top of the engine nacelles 36 and 38, if desired.

Various other modifications and changes may be made with respect to the foregoing detailed description without departing from the spirit of the present invention or the scope of the following claims.

I claim:

1. An aircraft, comprising: a pair of channel members, each forming an arcuate forwardly, upwardly and rearwardly opening channel; structural means fixedly supporting said channel members and extending rearwardly thereof; a propeller rotatable in each of said channels, the periphery of the disc defined by each propeller substantially coinciding with the upwardly-facing surface of its respective channel and an aft-located wing structure pivotally secured to said structural means aft of said channel members for pivotal movement about a horizontal axis normal to the direction of flight of said aircraft.

2. An aircraft as set forth in claim 1 wherein said wing structure is pivotally mounted on said structural means near the center of pressure of said wing structure.

3. An aircraft as set forth in claim 1 wherein said wing structure is of the biplane type.

4. An aircraft, comprising: a pair of channel members, each forming an arcuate forwardly, upwardly and rearwardly opening channel; a fuselage fixedly supporting said channel members and extending rearwardly thereof; a pair of boom members secured to the outer portions of said channel members and extending rearwardly thereof parallel to said fuselage; and an aft-located wing structure extending transversely between said boom members, said wing structure being pivotal relative to said boom members for horizontal movement about a transverse axis normal to the direction of flight of said aircraft.

5. An aircraft as set forth in claim 4 wherein said aft-located wing structure is pivotally mounted near the center of pressure of said wing structure.

6. An aircraft as set forth in claim 4 wherein said wing structure is of the biplane type.

7. An aircraft, comprising: a pair of channel members, each forming an arcuate forwardly, upwardly and rearwardly opening channel; forward thrust producing means disposed within said channel members; a fuselage fixedly supporting said channel members and extending rearwardly thereof; a pair of boom members secured to the outer portions of said channel members and extending rearwardly thereof parallel to said fuselage; and an aft-located wing structure extending transversely between said boom members, said wing structure being pivotal relative to said boom members for horizontal movement about a transverse axis normal to the direction of flight of said aircraft.

8. An aircraft as set forth in claim 7 wherein said aft-located wing structure is pivotally mounted near the center of pressure of said wing structure.

9. An aircraft as set forth in claim 7 wherein said aft-located wing structure is of the biplane type.

10. An aircraft, comprising: a pair of channel members, each forming an arcuate forwardly, upwardly and rearwardly opening channel; a fuselage fixedly supporting said channel members and extending rearwardly thereof; a pair of boom members secured to the outer portions of said channel members and extending rearwardly thereof parallel to said fuselage; horizontal struts extending transversely across the upper portion of each of said channel members; propeller means supported by said struts and disposed in each of said channel members; power plant means operatively connected to said propeller means; and an aft-located wing structure extending transversely between said boom members, said wing structure being pivotal relative to said boom members for horizontal movement about a transverse axis normal to the direction of flight of said aircraft.

11. An aircraft, comprising: a pair of channel members, each forming an arcuate forwardly, upwardly and rearwardly opening channel; a fuselage fixedly supporting said channel members and extending rearwardly thereof; a pair of boom members secured to the outer portions of said channel members and extending rearwardly thereof parallel to said fuselage; horizontal struts extending transversely across the upper portion of each of said channel members; propeller means supported by said struts and disposed in each of said channel members; power plant means operatively connected to said propeller means; and an aft-located wing structure of the biplane type extending transversely between said boom members, said wing structure being pivotal relative to said boom members for horizontal movement about a transverse axis normal to the direction of flight of said aircraft.

12. An aircraft, comprising: a pair of channel members, each forming an arcuate forwardly, upwardly and rearwardly opening channel; forward thrust producing means disposed within said channel members; a fuselage fixedly supporting said channel members and extending rearwardly thereof; a pair of boom members secured to the outer portions of said channel members and extending rearwardly thereof parallel to said fuselage; a vertical stabilizer on the rear portion of each of said boom members; air brakes formed on said vertical stabilizers; and an aft-located wing structure extending transversely between said boom members, said wing structure being pivotal relative to said boom members for horizontal movement about a transverse axis normal to the direction of flight of said aircraft.

13. An aircraft as set forth in claim 12 wherein said aft-located wing structure is pivotally mounted near the center of pressure of said wing structure.

14. An aircraft as set forth in claim 12 wherein said aft-located wing structure is of the biplane type.

15. An aircraft, comprising: a pair of channel members, each forming an arcuate forwardly, upwardly and rearwardly opening channel; a fuselage fixedly supporting said channel members and extending rearwardly thereof; a pair of boom members secured to the outer portions of said channel members and extending rearwardly thereof parallel to said fuselage; horizontal struts extending transversely across the upper portion of each of said channel members; propeller means supported by said struts and disposed in each of said channel members; power plant means operatively connected to said propeller means; a vertical stabilizer on the rear portion of each of said boom members; air brakes formed on said vertical stabilizers; and an aft-located wing structure of the biplane type extending transversely between said boom members, said wing structure being pivotal relative to said boom members for horizontal movement about a transverse axis normal to the direction of flight of said aircraft.

References Cited in the file of this patent
UNITED STATES PATENTS

| | | |
|---|---|---|
| 2,437,684 | Custer | Mar. 16, 1948 |
| 2,510,959 | Custer | June 13, 1950 |
| 2,937,823 | Fletcher | May 24, 1960 |
| 2,957,647 | Shew | Oct. 25, 1960 |